UNITED STATES PATENT OFFICE.

SOPHRONIA ATKINS, OF RIVER FALLS, WISCONSIN.

CORDAGE TO BE USED FOR BALE BANDS OR TIES.

SPECIFICATION forming part of Letters Patent No. 279,852, dated June 19, 1883.

Application filed February 14, 1883. (No specimens.)

*To all whom it may concern:*

Be it known that I, SOPHRONIA ATKINS, a citizen of the United States of America, residing at River Falls, in the county of Pierce and State of Wisconsin, have invented certain new and useful Improvements in Cordage; and I do hereby declare the following to be a full, clear, and exact description of the invention, such as will enable others skilled in the art to which it appertains to make and use the same.

This invention relates more especially to cordage which is adapted to be used for "bale bands or ties," the same being treated with a composition of certain ingredients, as will be hereinafter set forth, which will render the same repulsive and proof against the depredations of insects.

In carrying out my invention I make a decoction or extract of wormwood and tansy, using the ingredients in about these proportions—to wit, to three-fourths of a pound of wormwood one quarter of a pound of tansy-root. With these ingredients I make an extract by boiling them together in water. In this extract while it is hot I saturate the textile bands or cordage to be protected, and after saturating the same it is dried by any suitable means. The cordage or bands, after being saturated by the hereinbefore-described extract, is repulsive to insects, and they will not eat and destroy the same. This I have found to be a fact by actual experiment.

I have applied this invention more especially to grain-bands and other analogous purposes, and for making the bands for this special purpose, after they are cut to the proper length, I saturate and then dry the same, after which they are ready for use.

I am aware that the composition herein described is not, broadly, new, and that it is not new to treat cordage with a material which will repel insects, and I do not claim such as my invention; but

What I claim as new, and desire to secure by Letters Patent, is—

A bale band or tie of textile material treated with a solution of wormwood and tansy to render the same insect-proof, substantially as described.

In testimony whereof I affix my signature in presence of two witnesses.

SOPHRONIA ATKINS.

Witnesses:
   E. B. HOLMES,
   BRADFORD Q. ATKINS.